US011907119B2

(12) United States Patent
Jovanovic et al.

(10) Patent No.: US 11,907,119 B2
(45) Date of Patent: Feb. 20, 2024

(54) ARRAY ACCESS WITH RECEIVER MASKING

(71) Applicant: Micron Technology, Inc., Boise, ID (US)

(72) Inventors: Natalija Jovanovic, Munich (DE); Andrea Sorrentino, Munich (DE); Marcos Alvarez Gonzalez, Munich (DE)

(73) Assignee: Micron Technology, Inc., Boise, ID (US)

( * ) Notice: Subject to any disclaimer, the term of this patent is extended or adjusted under 35 U.S.C. 154(b) by 175 days.

(21) Appl. No.: 17/375,872

(22) Filed: Jul. 14, 2021

(65) Prior Publication Data

US 2023/0019093 A1 Jan. 19, 2023

(51) Int. Cl.
*G06F 12/06* (2006.01)
*G06F 12/02* (2006.01)

(52) U.S. Cl.
CPC .......... *G06F 12/0623* (2013.01); *G06F 12/02* (2013.01); *G06F 2212/251* (2013.01)

(58) Field of Classification Search
CPC .......... G06F 12/0623; G06F 2212/251; G06F 12/02
USPC ........................................................ 711/202
See application file for complete search history.

(56) References Cited

U.S. PATENT DOCUMENTS

| 5,274,589 A | 12/1993 | Koshizuka |
| 5,867,444 A | 2/1999 | Le et al. |
| 5,973,721 A * | 10/1999 | Bergmans ............ H04N 1/3247 358/1.9 |
| 6,011,728 A * | 1/2000 | Akeyama ............. G11C 7/1072 365/194 |
| 2005/0254307 A1* | 11/2005 | Dietrich .................... G11C 7/22 365/185.22 |
| 2007/0038790 A1* | 2/2007 | Lee ........................ G06F 11/221 710/113 |
| 2008/0031079 A1* | 2/2008 | Osawa ..................... G11C 8/08 365/233.1 |

(Continued)

FOREIGN PATENT DOCUMENTS

| AU | 664087 B2 | 11/1995 |
| EP | 0572366 B1 | 8/1998 |

OTHER PUBLICATIONS

"International Search Report and Written Opinion of the International Searching Authority," issued in connection with Int'l Appl. No. PCT/US2022/073488 dated Oct. 28, 2022 (10 pages).

*Primary Examiner* — Reginald G Bragdon
*Assistant Examiner* — Aaron D Ho
(74) *Attorney, Agent, or Firm* — Holland & Hart LLP

(57) ABSTRACT

Methods, systems, and devices for array access with receiver masking are described. A first device may issue to a second device a first sequence of write commands for a set of data. The first sequence of write commands may indicate different memory addresses in an order. After issuing the first sequence of write commands, the first device may issue to the second device a second sequence of read commands for the set of data. The second sequence of read commands may indicate the different memory addresses in the same order as the first sequence of write commands. Based on issuing the second sequence of read commands, the first device may receive the set of data from the second device.

30 Claims, 10 Drawing Sheets

(56) References Cited

U.S. PATENT DOCUMENTS

| | | | |
|---|---|---|---|
| 2011/0128806 A1* | 6/2011 | Takeshima | G11C 29/26 365/201 |
| 2013/0159769 A1 | 6/2013 | Buban et al. | |
| 2013/0336060 A1* | 12/2013 | Arakawa | G11C 16/06 365/185.09 |
| 2018/0232178 A1* | 8/2018 | Iwaki | G06F 3/0659 |
| 2019/0229749 A1 | 7/2019 | Sudhakaran et al. | |

\* cited by examiner

ARRAY ACCESS WITH RECEIVER MASKING

FIELD OF TECHNOLOGY

The following relates generally to one or more systems for memory and more specifically to array access with receiver masking.

BACKGROUND

Memory devices are widely used to store information in various electronic devices such as computers, user devices, wireless communication devices, cameras, digital displays, and the like. Information is stored by programing memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

DETAILED DESCRIPTION

Some memory devices may use coding techniques to improve performance. For example, a memory device may use maximum-transition-avoidance (MTA) coding to reduce voltage swings between sequential data symbols, which may otherwise negatively impact signal integrity. In some cases, the memory device may also use receiver masking (e.g., to train various aspects of the memory device), which may refer to the disablement of a subset of sub-receivers in one or more receivers of the memory device. But using receiver masking together with MTA coding may result in variable and unpredictable data changes that the memory device may be unable to reverse. For example, use of receiver masking and MTA coding may cause data stored at a memory array of the memory device to be different than original data sent to the memory device, and the memory device may be unable to reconstruct the original data. Thus, a memory device that uses MTA coding and receiver masking may be prevented from or may not be reliable in storing received data in a memory array, which may negatively impact the performance of the memory device. For example, the memory device may be prevented from storing data in the memory array during testing or other operations, which may reduce the efficiency and efficacy of the testing.

According to the techniques described herein, a host device (or other device) may enable memory array access by a memory device that uses MTA coding and receiver masking by: 1) issuing sequences of write commands that do not overwrite memory locations in the memory array, and 2) issuing read sequences that access memory locations in the memory array in the same order as corresponding write sequences. Avoiding over-writing within a sequence of write commands may ensure that at least some data changes are preserved and accessing memory locations in the same order during reading and writing may ensure that at least some data changes that occur during writing are undone during reading. MTA coding may also be referred to as MTA protection or other suitable terminology. A memory array may also be referred to as a memory core or other suitable terminology.

Features of the disclosure are initially described in the context of systems as described with reference to FIGS. 1 and 2. Features of the disclosure are described in the context of a timing diagram and a process flow as described with reference to FIGS. 3 and 4, respectively. These and other features of the disclosure are further illustrated by and described with reference to an apparatus diagram and flowcharts that relate to array access with receiver masking as described with reference to FIGS. 5-10.

Figure 1:
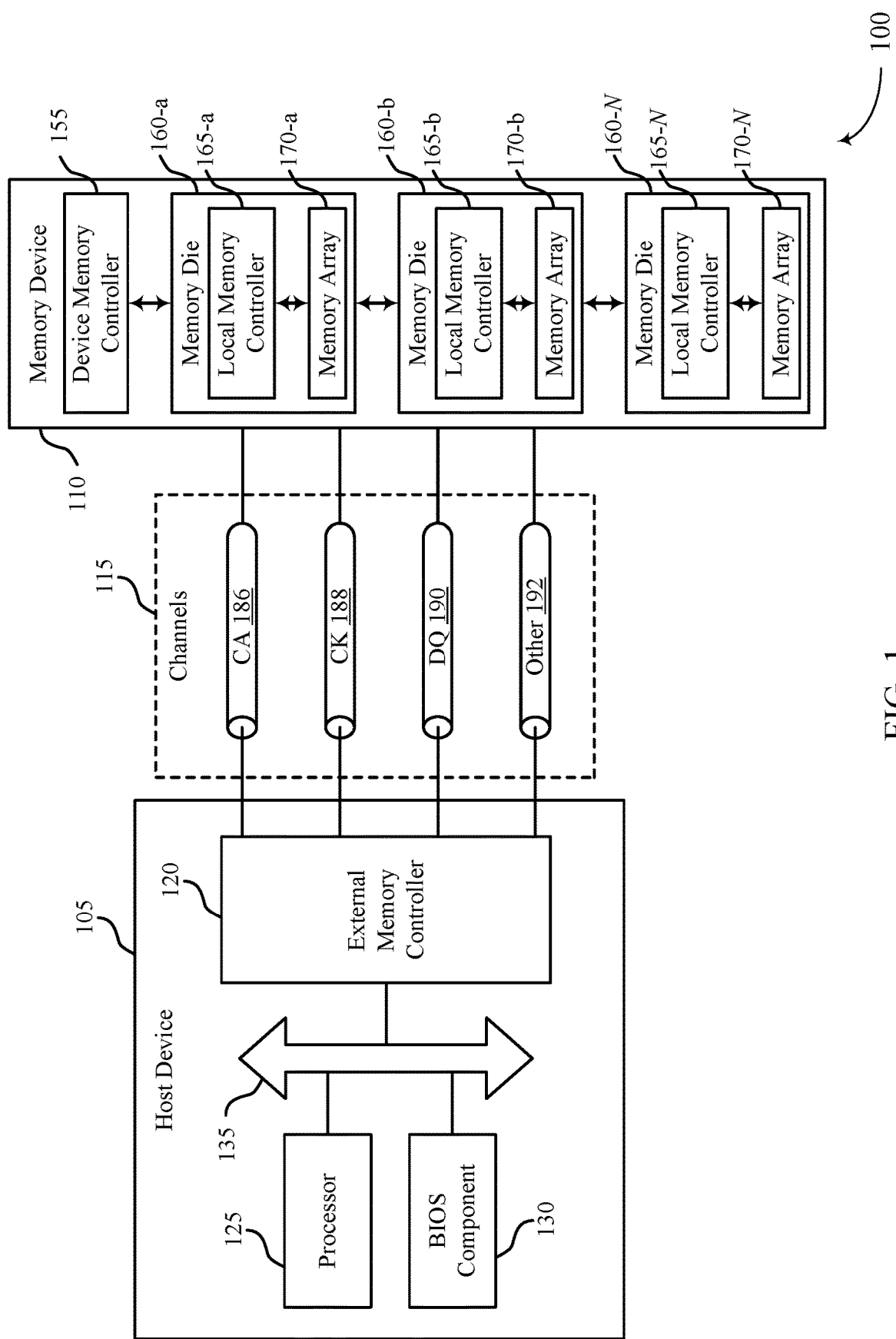
FIG. 1 illustrates an example of a system that supports array access with receiver masking in accordance with examples as disclosed herein.

FIG. 1 illustrates an example of a system 100 that supports array access with receiver masking in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system operable to store data for one or more other components of the system 100.

At least portions of the system 100 may be examples of the host device 105. The host device 105 may be an example of a processor or other circuitry within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or a combination thereof that implements the functions of an external memory controller 120. In some examples, the external memory controller 120 may be referred to as a host or a host device 105.

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other factors.

The memory device 110 may be operable to store data for the components of the host device 105. In some examples, the memory device 110 may act as a secondary-type or dependent-type device to the host device 105 (e.g., responding to and executing commands provided by the host device 105 through the external memory controller 120). Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of the host device 105 may be coupled with one another using a bus 135.

The processor 125 may be operable to provide control or other functionality for at least portions of the system 100 or at least portions of the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or a combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include a program or software stored in one or more of read-only memory (ROM), flash memory, or other non-volatile memory.

The memory device 110 may include a device memory controller 155 and one or more memory dies 160 (e.g., memory chips) to support a desired capacity or a specified capacity for data storage. Each memory die 160 (e.g., memory die 160-a, memory die 160-b, memory die 160-N) may include a local memory controller 165 (e.g., local memory controller 165-a, local memory controller 165-b, local memory controller 165-N) and a memory array 170 (e.g., memory array 170-a, memory array 170-b, memory array 170-N). A memory array 170 may be a collection (e.g., one or more grids, one or more banks, one or more tiles, one or more sections) of memory cells, with each memory cell being operable to store at least one bit of data. A memory device 110 including two or more memory dies 160 may be referred to as a multi-die memory or a multi-die package or a multi-chip memory or a multi-chip package.

The device memory controller 155 may include circuits, logic, or components operable to control operation of the memory device 110. The device memory controller 155 may include the hardware, the firmware, or the instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the memory device 110 may receive data or commands or both from the host device 105. For example, the memory device 110 may receive a write command indicating that the memory device 110 is to store data for the host device 105 or a read command indicating that the memory device 110 is to provide data stored in a memory die 160 to the host device 105.

In some examples, memory device 110 may operate in a support mode (e.g., a training mode, an analysis mode) in which data sequences (e.g., "patterns") are circulated through a receive path of the memory device 110, a transmit path of the memory device 110, or both. A training mode may refer to a mode in which the memory device 110 calibrates various voltages and timing parameters of the memory device 110. An analysis mode may refer to a mode in which the memory device 110 characterizes various components of the memory device 110.

A local memory controller 165 (e.g., local to a memory die 160) may include circuits, logic, or components operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165 or the external memory controller 120 may perform various functions described herein. As such, a local memory controller 165 may be operable to communicate with the device memory controller 155, with other local memory controllers 165, or directly with the external memory controller 120, or the processor 125, or a combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other circuits or controllers operable for supporting described operations of the device memory controller 155 or local memory controller 165 or both.

The external memory controller 120 may be operable to enable communication of one or more of information, data, or commands between components of the system 100 or the host device 105 (e.g., the processor 125) and the memory device 110. The external memory controller 120 may convert or translate communications exchanged between the components of the host device 105 and the memory device 110. In some examples, the external memory controller 120 or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be examples of transmission mediums that carry information between the host device 105 and the memory device. Each channel 115 may include one or more signal paths or transmission mediums (e.g., conductors) between terminals associated with the components of the system 100. A signal path may be an example of a conductive path operable to carry a signal. For example, a channel 115 may include a first terminal including one or more pins or pads at the host device 105 and one or more pins or pads at the memory device 110. A pin may be an example of a conductive input or output point of a device of the system 100, and a pin may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or a combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

In some examples, CA channels 186 may be operable to communicate commands between the host device 105 and the memory device 110 including control information associated with the commands (e.g., address information). For example, commands carried by the CA channel 186 may include a read command with an address of the desired data. In some examples, a CA channel 186 may include any quantity of signal paths to decode one or more of address or command data (e.g., eight or nine signal paths).

In some examples, data channels 190 may be operable to communicate one or more of data or control information between the host device 105 and the memory device 110. For example, the data channels 190 may communicate information (e.g., bi-directional) to be written to the memory device 110 or information read from the memory device 110.

The channels 115 may include any quantity of signal paths (including a single signal path). In some examples, a channel 115 may include multiple individual signal paths. For example, a channel may be ×4 (e.g., including four signal paths), ×8 (e.g., including eight signal paths), ×16 (including sixteen signal paths), etc.

Signals communicated over the channels 115 may be modulated using one or more different modulation schemes. In some examples, a binary-symbol (or binary-level) modulation scheme may be used to modulate signals communicated between the host device 105 and the memory device 110. A binary-symbol modulation scheme may be an example of a M-ary modulation scheme where M is equal to two. Each symbol of a binary-symbol modulation scheme may be operable to represent one bit of digital data (e.g., a symbol may represent a logic 1 or a logic 0). Examples of binary-symbol modulation schemes include, but are not limited to, non-return-to-zero (NRZ), unipolar encoding, bipolar encoding, Manchester encoding, pulse amplitude modulation (PAM) having two symbols (e.g., PAM2), and/or others.

In some examples, a multi-symbol (or multi-level) modulation scheme may be used to modulate signals communicated between the host device 105 and the memory device 110. A multi-symbol modulation scheme may be an example of a M-ary modulation scheme where M is greater than or equal to three. Each symbol of a multi-symbol modulation scheme may be operable to represent more than one bit of digital data (e.g., a symbol may represent a logic 00, a logic 01, a logic 10, or a logic 11). Examples of multi-symbol modulation schemes include, but are not limited to, PAM3, PAM4, PAM8, etc., quadrature amplitude modulation (QAM), quadrature phase shift keying (QPSK), and/or others. A multi-symbol signal (e.g., a PAM3 signal or a PAM4 signal) may be a signal that is modulated using a modulation scheme that includes at least three levels to encode more than one bit of information. Multi-symbol modulation schemes and symbols may alternatively be referred to as non-binary, multi-bit, or higher-order modulation schemes and symbols.

So, the memory device 110 may use a modulation scheme, such as PAM, to modulate data for efficient signaling. As noted, the memory device 110 may use PAM4 signaling which includes four voltage levels each associated with a respective symbol that represents multiple (e.g., two) bits. For example, the lowest PAM4 voltage level (e.g., −3) may be associated with a first symbol (e.g., symbol 0) that represents a first multi-bit logic value (e.g., '00'), the second lowest PAM4 voltage level (e.g., −1) may be associated with a second symbol (e.g., symbol 1) that represents a second multi-bit logic value (e.g., '01'), the second highest PAM4 voltage level (e.g., +1) may be associated with a third symbol (e.g., symbol 2) that represents a third multi-bit logic value (e.g., '11'), and the highest voltage level (e.g., +3) may be associated with a fourth symbol (e.g., symbol 3) that represents a fourth multi-bit logic value (e.g., '10).

To reduce issues that may arise from extreme changes in PAM4 voltage levels during signaling, or for other reasons, the memory device 110 may also use a coding scheme, such as maximum transition avoidance (MTA) coding. MTA coding may prevent consecutive PAM4 symbols from having logic values that result in a data signal transitioning a threshold amount, such as three voltage levels (e.g., MTA coding may prevent adjacent PAM4 symbols from transitioning from the lowest voltage level to the highest voltage level, and vice versa).

In some examples, the memory device 110 may implement receiver masking which allows the memory device 110 to train or analyze receivers on a sub-receiver basis, among other aspects. For example, the host device 150 may characterize and train the memory device 105, which may use receiver masking in those processes. Receiver masking may help characterize and train operating voltages for sub-receivers. But use of receiver masking and MTA coding together may result in data changes during propagation that the memory device 110 is unable to correct. Thus, a memory device 110 that uses receiver masking in conjunction with MTA coding may be unable to access a memory array for various operations, such as testing, which may limit the benefits of the operations. According to the techniques described herein, the host device 105 (or another device, such as a testing device) may enable memory array access by a memory device 110 that uses receiver masking and MTA coding. The host device 105 may enable memory array access by 1) issuing sequences of write commands that do not overwrite locations of the memory array and 2) issuing sequences of read commands that access locations of the memory array in the same order as corresponding write sequences.

Figure 2:
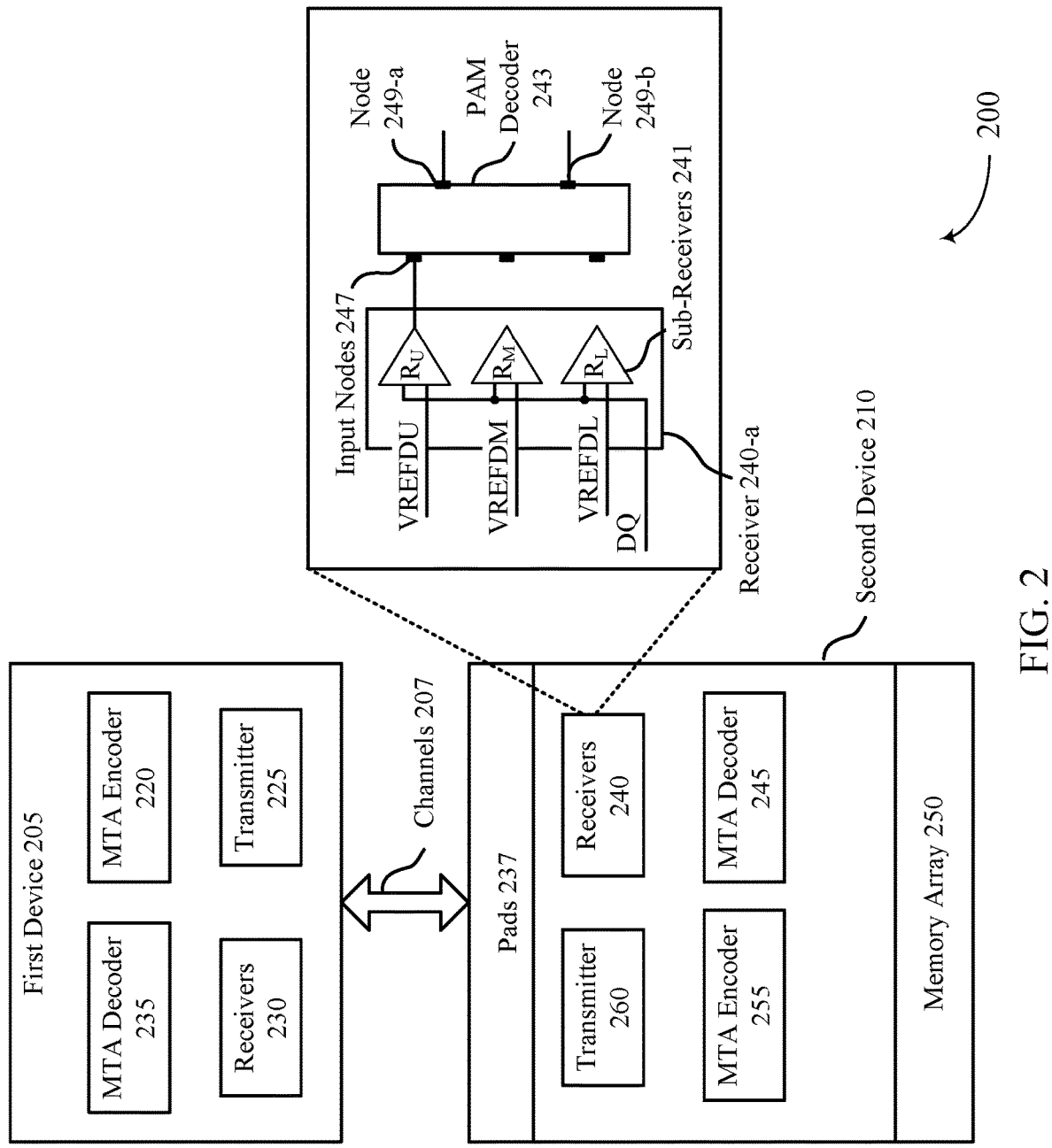
FIG. 2 illustrates an example of a system that supports array access with receiver masking in accordance with examples as disclosed herein.

FIG. 2 illustrates an example of system 200 that supports array access with receiver masking in accordance with examples as disclosed herein. The system 200 may include a first device 205 and a second device 210, which may be coupled with each other via channels 207, which may include conductive traces, buses, bus interfaces, etc. The first device 205 may be an example of a host device 105 and the second device 210 may be an example of a memory device 110 as described with reference to FIG. 1. However, other types of devices are contemplated and are within the scope of the present disclosure. The first device 205 may intelligently issue sequences of commands to the second device 210 so that the second device 210 is able to access the memory array 250 even if the second device 210 is using MTA coding in conjunction with receiver masking.

The first device 205 may include components that support MTA encoding and MTA decoding. For example, the first device 205 may include MTA encoder 220 and MTA decoder 235.

The MTA encoder 220 may be configured to perform MTA encoding on input data and to output MTA-encoded data. MTA-encoded data may be data that is free of maximum transitions between adjacent data symbols. In some examples, the MTA encoder 220 may include multiple stages. For example, the MTA encoder 220 may involve an MTA look-up-table (LUT) stage that prevents maximum transitions within a burst of data (e.g., a 4-symbol burst) and an inversion stage that prevents maximum transitions between sequential bursts. Thus, in some examples, the MTA encoder 220 may be configured to prevent or remove maximum transitions within a burst of data by applying the MTA-LUT and may further be configured to prevent or remove maximum transitions between sequential bursts data (e.g., 4-symbol bursts) by performing one or more inversions. In some examples, the MTA encoder 220 may be coupled with a PAM encoder that modulates MTA-encoded data using PAM4 or another PAM scheme.

The MTA decoder 235 may be configured to perform MTA decoding on input data (e.g., MTA-encoded data) and to output decoded data. The MTA decoder 235 may include a LUT stage and an inversion stage. Thus, the MTA decoder 235 may restore MTA-encoded data to an original form by performing a reciprocal or inverted process relative to the MTA encoder 220. In some examples, the MTA decoder 235 may be coupled with a PAM decoder that demodulates data modulated using PAM4 or another PAM scheme.

The first device 205 may also include components for sending and receiving signals over the channels 207. For example, the first device 205 may include a transmitter 225, which may include one or more drivers and may be configured to transmit data (e.g., MTA-encoded data, PAM4-modulated data) over the channels 207. In some examples, the transmitter 225 may be coupled with the MTA encoder 220, the PAM encoder, or both. The first device 205 may also include receivers 230 which may be configured to receive data over the channels 207. The receivers 240 may be coupled with pads 237, which may be conductive terminals or nodes.

Similar to the first device 205, the second device 210 may also include components that support MTA encoding and MTA decoding. For example, the second device 210 may include MTA encoder 245 and MTA decoder 255. The MTA encoder 245 may operate similar to the MTA encoder 220 and the MTA decoder 255 may operate similar to the MTA decoder 235.

Similar to the first device 205, the second device 210 may also include components for sending and receiving signals over the channels 207. For example, the second device 210 may include receivers 240 and transmitter 260, which may operate similar to receivers 230 and transmitter 225. In some examples, the receivers 240 may be coupled with one or more PAM decoders that are configured to perform demodulation of data symbols modulated with PAM4 or other PAM scheme. For example, each receiver of the receivers 240 may be coupled with a respective PAM decoder.

The receivers 240 may be operated in at least a first mode, such as a non-masking mode, or in second mode, such as a masking mode (which may also be referred to as a sub-receiver masking mode or a receiver masking mode). For ease of reference, the non-masking mode and the masking mode are described with reference to receiver 240-a, which may be a receiver included in the receivers 240. However, the description may be generally applicable to any of the receivers in the receivers 240.

In the non-masking mode, at least some sub-receivers 241 if not each sub-receiver 241 in receiver 240-a may be enabled (e.g., each sub-receiver 241 may have an enabled data path). For example, each sub-receiver 241a may be coupled with a respective input node 247 of the PAM decoder 243. The sub-receivers 241 may include a sub-receiver (denoted $R_U$) configured to compare the voltage level of an incoming data symbol (DQ) with a highest reverence voltage (e.g., VREFDU), a sub-receiver (denoted $R_M$) configured to compare the voltage level of the incoming data symbol to an intermediate reference voltage (e.g., VREFDM), and a sub-receiver (denoted $R_L$) configured to compare the voltage level of the incoming data symbol to a lowest reference voltage (e.g., VREFDL).

The receiver 240-a may operate on data symbols received over a data line (e.g., from the channels 207) coupled with the receivers 240. Each sub-receiver 241 may output a voltage level indicative of a logic value to the PAM decoder 243 based on, for example, the comparison result for the data symbol (e.g., a sub-receiver 241 may output a logic 0 if the voltage level of the data symbol is lower than the reference voltage and may output a logic 1 if the voltage level of the data symbol is higher than the reference voltage). The PAM decoder 243 may generate the LSB and MSB of the data symbol based on the logic values received from the sub-receivers 241. The LSB and MSB may be generated on respective output nodes (e.g., the MSB output node 249-*a* and the LSB output node 249-*b*). Thus, the PAM decoder 243 may perform PAM demodulation.

In the masking mode, a subset of sub-receiver 241 in receiver 240-*a* may be enabled (e.g., have enabled data paths) and a subset of sub-receivers 241 may be disabled (e.g., have disabled data paths). For example, a single sub-receiver 241 (referred to as the enabled sub-receiver) in receiver 240-*a* may be coupled with an input node 247 of the PAM decoder 243 (as shown in FIG. 2). The enabled sub-receiver 241 (e.g., sub-receiver $R_U$) may be coupled with the input node for the MSB data path so that the MSBs generated at the MSB output node 249-*a* reflect characteristics of the enabled sub-receiver 241. The other sub-receivers 241 in receiver 240-*a* (which may also be referred to as disabled sub-receivers) may be isolated from the PAM decoder 243. In the illustrated example, sub-receiver $R_U$ is enabled so the output of sub-receiver $R_U$ is coupled with the PAM decoder 243 and the other sub-receivers 241 are isolated (e.g., via switching components) from the PAM decoder 243. However, other configurations and examples are specifically contemplated. The LSB output node 249-*b* may be fixed (e.g., forced) as a logic 1, and thus the LSBs generated by the receiver 240-*a* may not carry meaningful data for the sub-receivers 241 in the receiver masking mode. That is, the LSBs may not reflect characteristics of the sub-receivers 241 because the LSBs are generated independent of the sub-receivers 241. Thus, in the receiver masking mode, a single sub-receiver 241 may be isolated (e.g., for training or testing).

An enabled sub-receiver 241 may also be referred to as an active or activated sub-receiver 241, among other suitable terminology, and a disabled sub-receiver 241 may also be referred to as an inactive or deactivated sub-receiver, among other suitable terminology.

The second device 210 may use receiver masking and MTA coding alone or together. If the second device 210 uses receiver masking and MTA coding together, the second device 210 may not be able to access the memory array 250 for data from the first device 205 unless the first device 205 implements the techniques described herein. For example, consider original data (D0, D0), which may be sent via the channels 207 as data (A, B) after the first device 205 performs MTA encoding. If the second device 210 is using receiver masking, performing MTA decoding may result in data (M0, M1), which is not only different than original data (D0, D0) (e.g., because M1 may be a function of M0 if M1 is transmitted within a threshold amount of time of M0) but cannot be reconstructed into the original data (D0, D0) (e.g., because receiver masking may destroy the reciprocity of MTA encoding/decoding).

According to the techniques described herein, the first device 205 may issue commands to the second device 210 so that at least some changes to data resulting from receiver masking and MTA coding are at least partially reversible. Specifically, the first device 205 may recognize, determine, or issue sequences of write commands (referred to as write sequences) that are separated by less than a threshold duration. Within each write sequence the first device 205 may avoid overwriting, where overwriting refers to writing data to a location more than once. Thus, each write command in a given write sequence may, relative to other write commands in the write sequence, indicate a unique memory location (e.g., memory address) within the memory array 250. Put another way, no memory address may be repeated within a write sequence, so that no memory location is written twice. Thus, at least some changes to the data (e.g., due to receiver masking and MTA coding) may be at least partially preserved. The first device 205 may prevent or avoid overwriting within a write sequence even if some data associated with the write sequence is repeated (e.g., identical) within the write sequence.

In addition to preventing overwriting within the respective write sequences, the first device 205 may also ensure that the data associated with a write sequence is accessed in the same order during reading as writing. For example, the first device 205 may issue sequences of read commands (referred to as read sequences) that indicate memory addresses in the same order as a corresponding write sequence. Put another way, for a given write sequence the first device 205 may issue a corresponding read sequence that accesses the data associated with the write sequence in the same order as the write sequence. In this way, at least some changes to the data (e.g., due to receiver masking and MTA coding) that occur in the write-direction may be undone in the read direction.

By 1) preventing overwriting within write sequences, and 2) reading data in the same order as written, the first device 205 may prevent at least some irreversible data changes that may otherwise occur if the second device 210 uses receiver masking in conjunction with MTA coding. For example, preventing over-writing within a write sequence may ensure that at least some data changes are preserved and reading data in the same order as written may ensure that at least some data changes that occur during writing are undone during reading. Alternatively, the first device 205 may prevent at least some irreversible data changes by ensuring that adjacent write commands are separated by at least the threshold duration and that adjacent read commands are separated by at least the threshold duration. By ensuring adequate spacing between commands the first device 205 may prevent the inversion stage of MTA coding from being applied, which may be partially or wholly responsible for the irreversible data changes that occur if receiver masking and MTA coding are used together.

Figure 3:
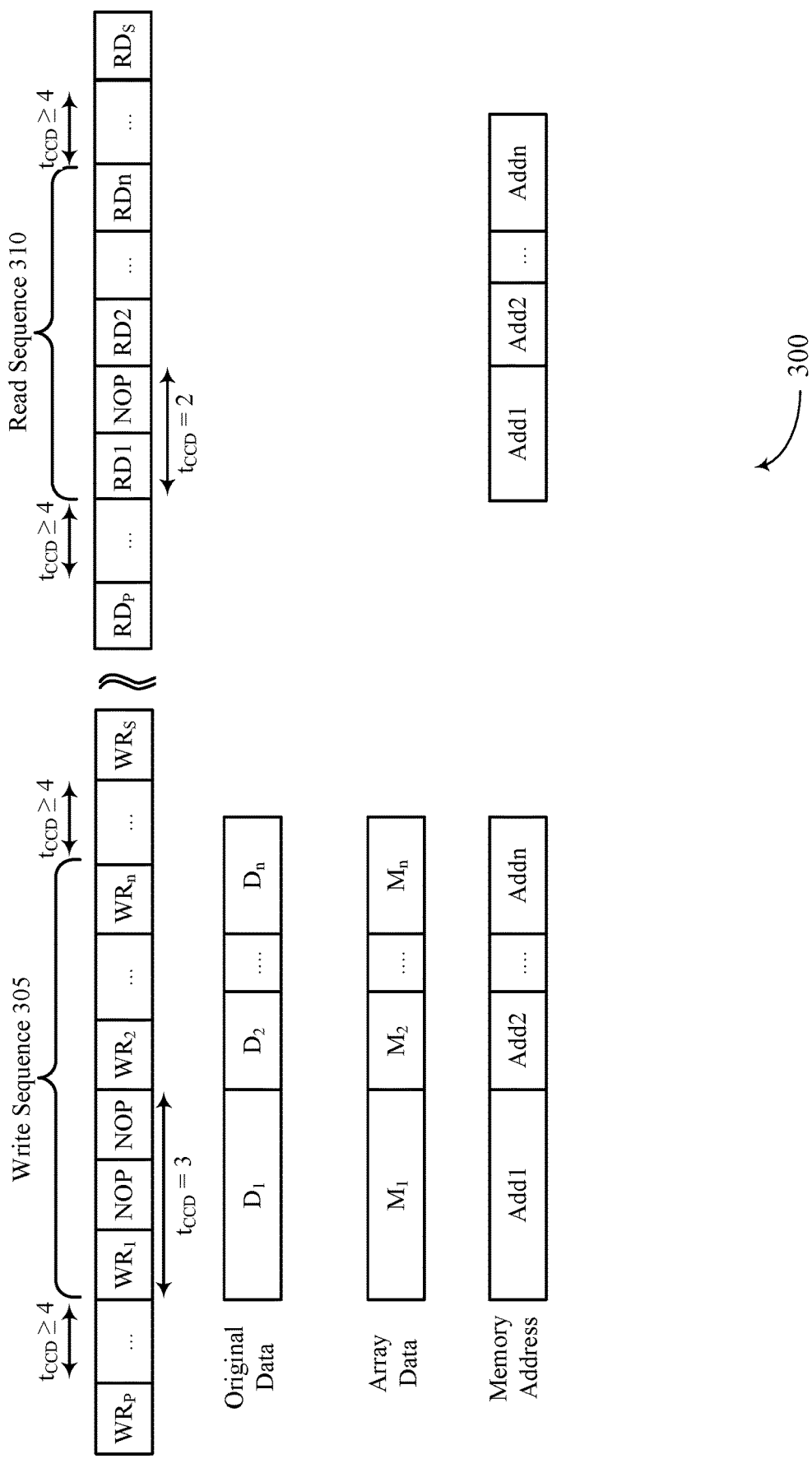
FIG. 3 illustrates an example of a timing diagram that supports array access with receiver masking in accordance with examples as disclosed herein.

FIG. 3 illustrates an example of a timing diagram 300 that supports array access with receiver masking in accordance with examples as disclosed herein. The timing diagram 300 may include write commands (denoted WR) and read commands (denoted RD) issued by a first device (e.g., a host device) to a second device (e.g., a memory device, such as the second device 210). Write commands and read commands may be examples of functional commands that indicate memory access operations (e.g., activate operations, precharge operations, read operations, write operations). In some examples, the timing diagram 300 may include no-operation commands (denoted NOP), which may be examples of non-functional commands that do not indicate memory access operations.

The timing diagram 300 may illustrate how the first device may strategically issue sequences of commands so that the second device using is able to access the memory array 250 for data associated with the commands even if the second device is using receiver masking and MTA coding. For example, the first device may issue a write sequence and a corresponding read sequence so that 1) the write sequence and the read sequence satisfy one or more timing conditions and 2) the write sequence and the read sequence indicate the same memory addresses in the same order.

The timing diagram 300 may include a write sequence 305, which may include a series of adjacent write commands that are separated by less than a threshold duration (e.g., as a first timing condition). For example, adjacent write commands within the write commands $WR_1$ through $WR_n$ may be separated by less than the threshold duration.

In some examples, the threshold duration may be referred to in terms of $t_{CCD}$, which may be the quantity of command cycles between adjacent functional commands. Thus, $t_{CCD}=2$ may refer to functional commands that are separated by two command cycles, $t_{CCD}=3$ may refer to functional commands that are separated by three command cycles, and $t_{CCD}\geq 4$ may refer to functional commands that are separated by at least four command cycles. In the given example, the threshold duration may be equal to $t_{CCD}\geq 4$. Thus, adjacent write commands in the write sequence 305 may be separated by an amount of time less than $t_{CCD}=4$ (e.g., adjacent write commands may be separated by $t_{CCD}=2$ or $t_{CCD}=3$). Given various timing constraints there may be at least one command cycle between adjacent write commands, in some examples.

The write sequence 305 may be separated from other sequences of functional commands, such as other write sequences, by at least the threshold duration (e.g., as a second timing condition). For example, the first write command (e.g., $WR_1$) of the write sequence 305 may be separated from an adjacent write command (e.g., $WR_P$) of a previous write sequence by at least the threshold duration (e.g., $t_{CCD}\geq 4$). And the last write command (e.g., $WR_n$) of the write sequence 305 may be separated from an adjacent write command (e.g., $WR_S$) of a subsequent write sequence by at least the threshold duration.

Each write command in the write sequence 305 may be associated with (e.g., include, indicate) a respective memory address, and the memory addresses indicated by the write sequence 305 may be unique (e.g., not repeated, different-valued). For example, write command $WR_1$ may indicate Add1, write command $WR_2$ may indicate Add2, and write command $WR_n$ may indicated Addn. Thus, no memory address may be over-written within the write sequence 305. Each write command may also be associated with respective data. For example, write command $WR_1$ may be associated with data $D_1$, write command $WR_2$ may be associated with data D2, and write command $WR_n$ may be associated with data $D_n$.

Although the original data is $D_1$ through $D_n$, the data received by the second device may be in an intermediate form (e.g., $A_1$ through $A_n$) and may be further transformed into data $M_1$ through $M_n$ (e.g., due at least in part to receiver masking and MTA coding). Thus, the second device may store the data as data $M_1$ through $M_n$. For example, data $M_1$ may be stored at memory address Add1, data $M_2$ may be stored at memory address Add2, and data $M_n$ may be stored at memory address Addn. Unlike in other techniques, the strategic issuance of commands to the second device as described herein may allow second device to at least partially reverse the transformation of data $M_1$ through $M_n$ so that at least some of the original data $D_1$ through $D_n$ can be recovered.

After receiving the write sequence 305 (and, in some examples, after writing the data $M_1$ through $M_n$ to the memory array), the second device may receive a corresponding read sequence 310. The read sequence 310 may include a series of adjacent read commands that are separated by less than the threshold duration. For example, adjacent read commands within the read commands $RD_1$ through $RD_n$ may be separated by less than the threshold duration. Continuing the forgoing illustration, adjacent read commands in the read sequence 310 may be separated by an amount of time less than $t_{CCD}=4$ (e.g., adjacent read commands may be separated by $t_{CCD}=2$ or $t_{CCD}=3$). Given various timing constraints there may be at least one command cycle between adjacent read commands, in some examples.

The read sequence 310 may be separated from other sequences of functional commands, such as other read sequences, by at least the threshold duration (e.g., $t_{CCD}\geq 4$). For example, the first read command (e.g., $RD_1$) of the read sequence 310 may be separated from an adjacent read command (e.g., $RD_P$) of a previous read sequence by at least the threshold duration. And the last read command (e.g., $WR_n$) of the read sequence 310 may be separated from an adjacent read command (e.g., $RD_S$) of a subsequent read sequence by at least the threshold duration.

Each read command in the read sequence 310 may be associated with (e.g., include, indicate) a respective memory address, and the memory addresses indicated by the read sequence 310 may be in the same order as indicated by the write sequence 305. For example, read command $RD_1$ may indicate memory address Add1, read command $RD_2$ may indicate memory address Add2, and read command $RD_n$ may indicate memory address Addn.

In response to receiving the read sequence 310, the second device may read the data from the memory addresses indicated by the read sequence 310 and return the data to the first device (e.g., after one or more processing steps, such as MTA encoding, PAM4 modulation). For example, the second device may read data $M_1$ from memory address Add1, may read data $M_2$ from memory address Add2, and may read data $M_n$ from memory address Addn. After processing the data (e.g., in a manner that is reciprocal to processing that occurred during writing), the data may be sent by the second device to the first device, which may finish transforming at least some of the data back into its original form ($D_1$ through $D_n$). Thus, the second device may write data to, and read data from, the memory array with less information loss, even if the second device is using receiver masking together with MTA coding.

Figure 4:
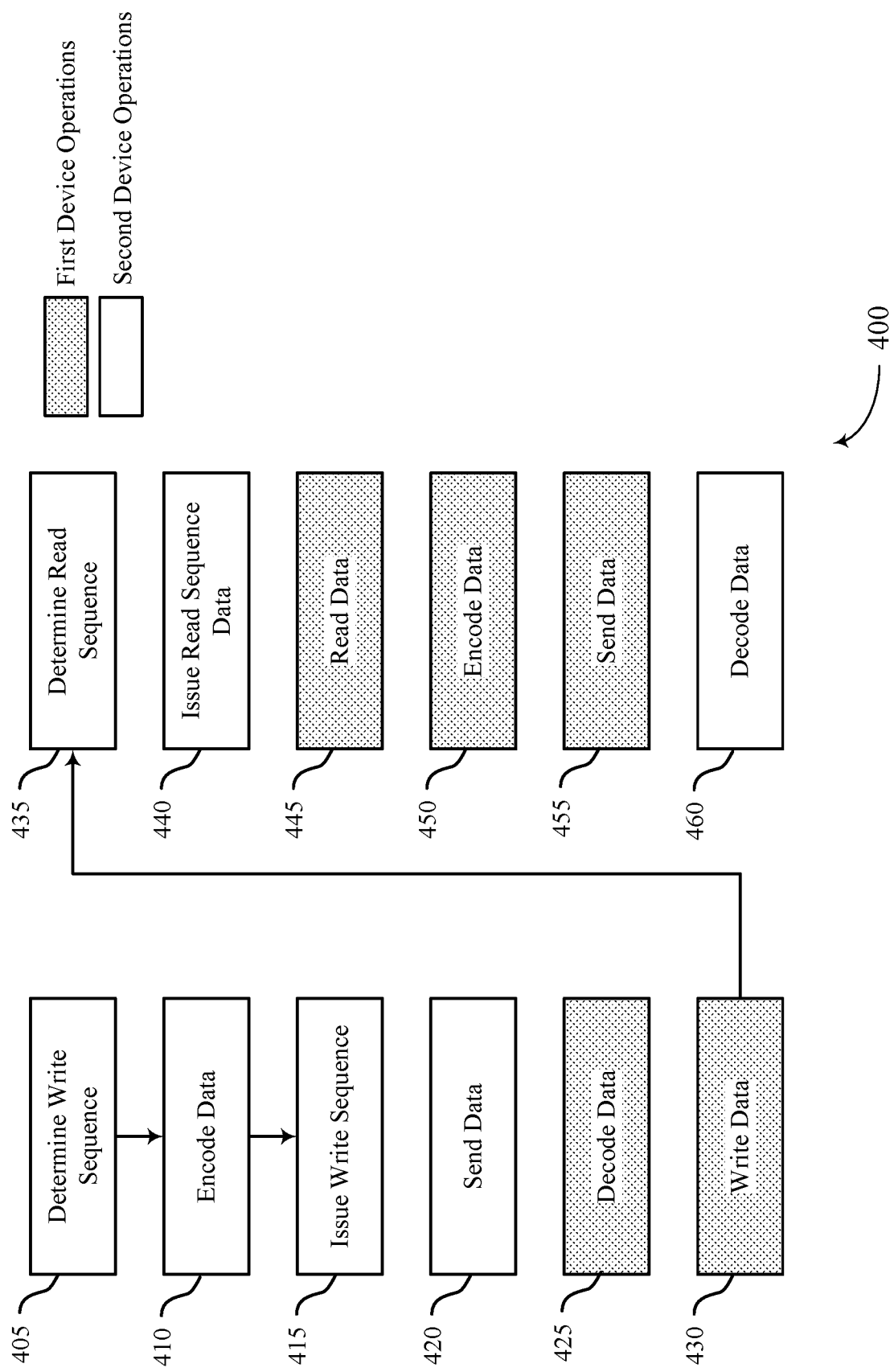
FIG. 4 illustrates an example of a process flow that supports array access with receiver masking in accordance with examples as disclosed herein.

FIG. 4 illustrates an example of a process flow 400 that supports array access with receiver masking in accordance with examples as disclosed herein. The process flow 400 may be implemented by a first device and a second device. The first device may be an example of a host device 105 as described with reference to FIG. 1 or a first device as described with reference to FIGS. 2 and 3. The second device may be an example of a memory device 110 as described with reference to FIG. 1 or a second device as described with reference to FIGS. 2 and 3. However, other types of devices or components (or combinations thereof) may implement the process flow 400.

At 405, the first device may determine a write sequence for a set of data. For example, the first device may determine a write sequence similar to the write sequence 305 described with reference to FIG. 3. Thus, the write sequence may indicate memory addresses in an order and may not overwrite any memory addresses. At 410, the first device may encode the set of data using, for example, MTA encoding. In some examples, the first device may also modulate the set of data (e.g., after MTA-encoding the set of data) using PAM4 or another PAM scheme. At 415, the first device may issue (e.g., send, transmit, communicate) the write sequence to the second device. At 420, the first device may send to the second device the set of data associated with the write sequence.

At 425, the second device may decode the set of data received from the first device. For example, the second device may perform MTA-decoding on the set of data. In some examples, the second device may perform PAM4 demodulation of the set of data before decoding the set of data. At 430, the second device may write the set of data to the memory addresses indicated by the write sequence. At 435, the first device may determine a read sequence for the set of data. For example, the first device may determine a read sequence similar to the read sequence 310 described with reference to FIG. 3. Thus, the read sequence may indicate memory addresses in the same order as the write sequence. At 440, the first device may issue (e.g., send, transmit, communicate) the read sequence to the second device.

At 445, the second device read the set of data from the memory addresses indicated by the read sequence. Thus, the set of data may be read from the memory array in the same order that the set of data was written to the memory array. At 450, the second device may encode the set of data using, for example, MTA encoding. In some examples, the second device may also modulate the set of data (e.g., after MTA-encoding the set of data) using PAM4 or another PAM scheme. At 455, the second device may send the set of data to the first device. At 460, the first device may decode the set of data received from the second device. For example, the first device may perform MTA-decoding on the set of data. In some examples, the first device may perform PAM4 demodulation of the set of data before decoding the set of data.

Thus, the first device may enable memory array access for the second device even if the second device is using receiver masking together with MTA coding. Alternative examples of the foregoing may be implemented, where some operations are performed in a different order than described, are performed in parallel, or are not performed at all. In some cases, operations may include additional features not mentioned herein, or further operations may be added. Additionally, certain operations may be performed multiple times or certain combinations of operations may repeat or cycle.

Although process flow 400 has been described as certain steps being performed by one device or another (e.g., a first device, a second device), in some examples at least some of the steps described for process flow 400 may be implemented by a different device (e.g., if process flow 400 describes a step being implemented by a first device then the step may additionally or alternatively be implemented by a second device or another device. Similarly, if process flow 400 describes a step being implemented by a second device then the step may additionally or alternatively be implemented by a first device or another device).

Figure 5:
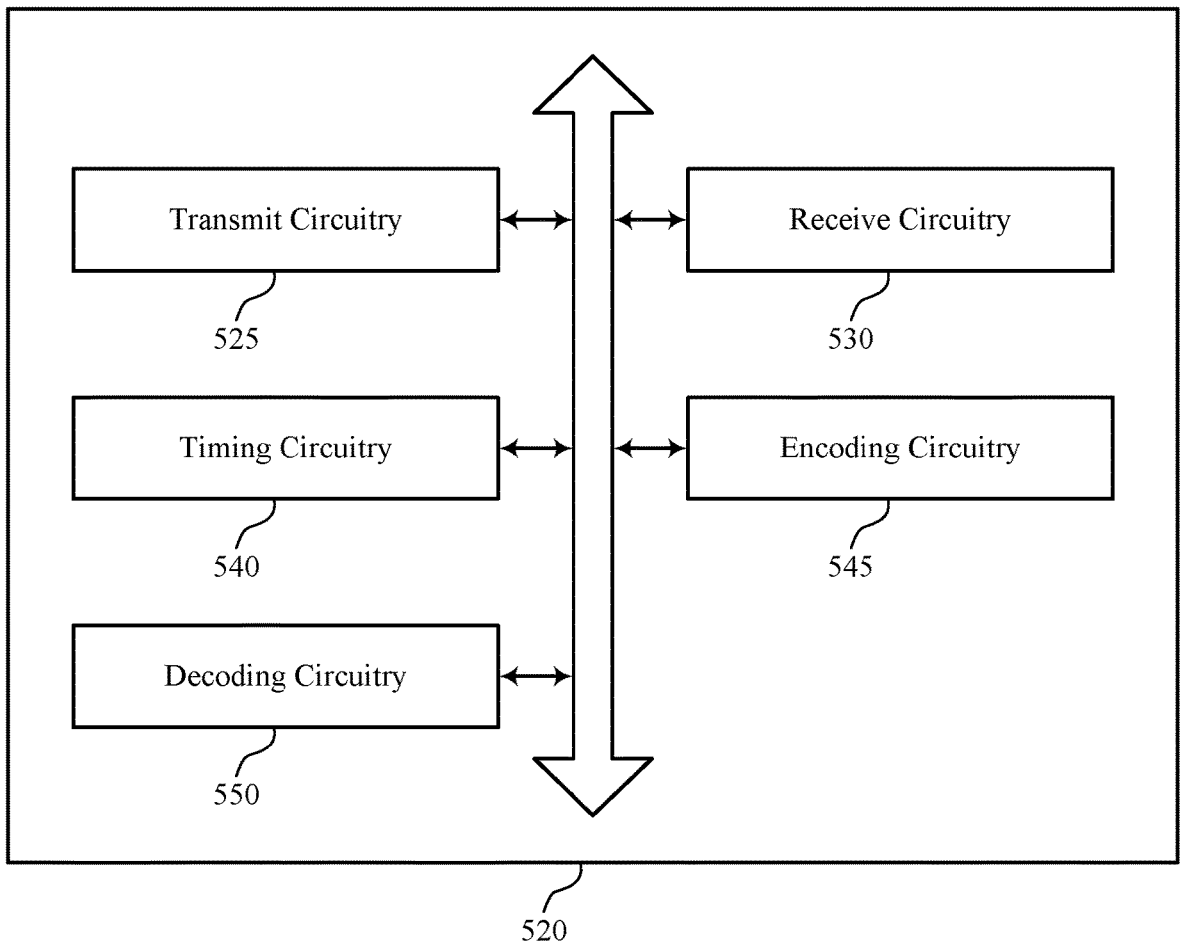
FIG. 5 shows a block diagram of a host device that supports array access with receiver masking in accordance with examples as disclosed herein.

FIG. 5 shows a block diagram 500 of a host device 520 that supports array access with receiver masking in accordance with examples as disclosed herein. The host device 520 may be an example of aspects of a host device as described with reference to FIGS. 1 through 4. The host device 520, or various components thereof, may be an example of means for performing various aspects of array access with receiver masking as described herein. For example, the host device 520 may include a transmit circuitry 525, a receive circuitry 530, a timing circuitry 540, an encoding circuitry 545, a decoding circuitry 550, or any combination thereof. Each of these components may communicate, directly or indirectly, with one another (e.g., via one or more buses).

The transmit circuitry 525 may be configured as or otherwise support a means for issuing, to a second device, a first sequence of write commands for a set of data, the first sequence of write commands indicating different memory addresses in an order. In some examples, the transmit circuitry 525 may be configured as or otherwise support a means for issuing, to the second device after issuing the first sequence of write commands, a second sequence of read commands for the set of data, the second sequence of read commands indicating the different memory addresses in the same order as the first sequence of write commands. The receive circuitry 530 may be configured as or otherwise support a means for receiving, from the second device, the set of data based at least in part on issuing the second sequence of read commands.

In some examples, each of the write commands in the first sequence of write commands indicate a respective unique address. In some examples, the timing circuitry 540 may be configured as or otherwise support a means for determining that a timing condition associated with the first sequence of write commands is satisfied, where the first sequence of write commands is determined based at least in part on the timing condition being satisfied.

In some examples, to support determining that the timing condition is satisfied, the timing circuitry 540 may be configured as or otherwise support a means for determining that a first write command of the first sequence of write commands is separated from a preceding write command by at least a threshold duration. In some examples, to support determining that the timing condition is satisfied, the timing circuitry 540 may be configured as or otherwise support a means for determining that a last write command of the first sequence of write commands is separated from a subsequent write command by at least the threshold duration.

In some examples, the write commands of the first sequence are separated from each other by less than the threshold duration. In some examples, read commands of the second sequence are separated from each other by less than the threshold duration and the second sequence of read commands is separated from one or more other sequences of read commands by at least the threshold duration.

In some examples, the transmit circuitry 525 may be configured as or otherwise support a means for issuing, to the second device, a command indicating a receiver masking mode that disables a subset of sub-receivers in a receiver of the second device, where the first sequence of write commands is issued to the second device based at least in part on issuing the command indicating the receiver masking mode.

In some examples, the encoding circuitry 545 may be configured as or otherwise support a means for performing MTA encoding on the set of data. In some examples, the transmit circuitry 525 may be configured as or otherwise support a means for sending the set of data to the second device based at least in part on performing MTA encoding. In some examples, the decoding circuitry 550 may be configured as or otherwise support a means for performing MTA decoding on the received set of data.

Figure 6:
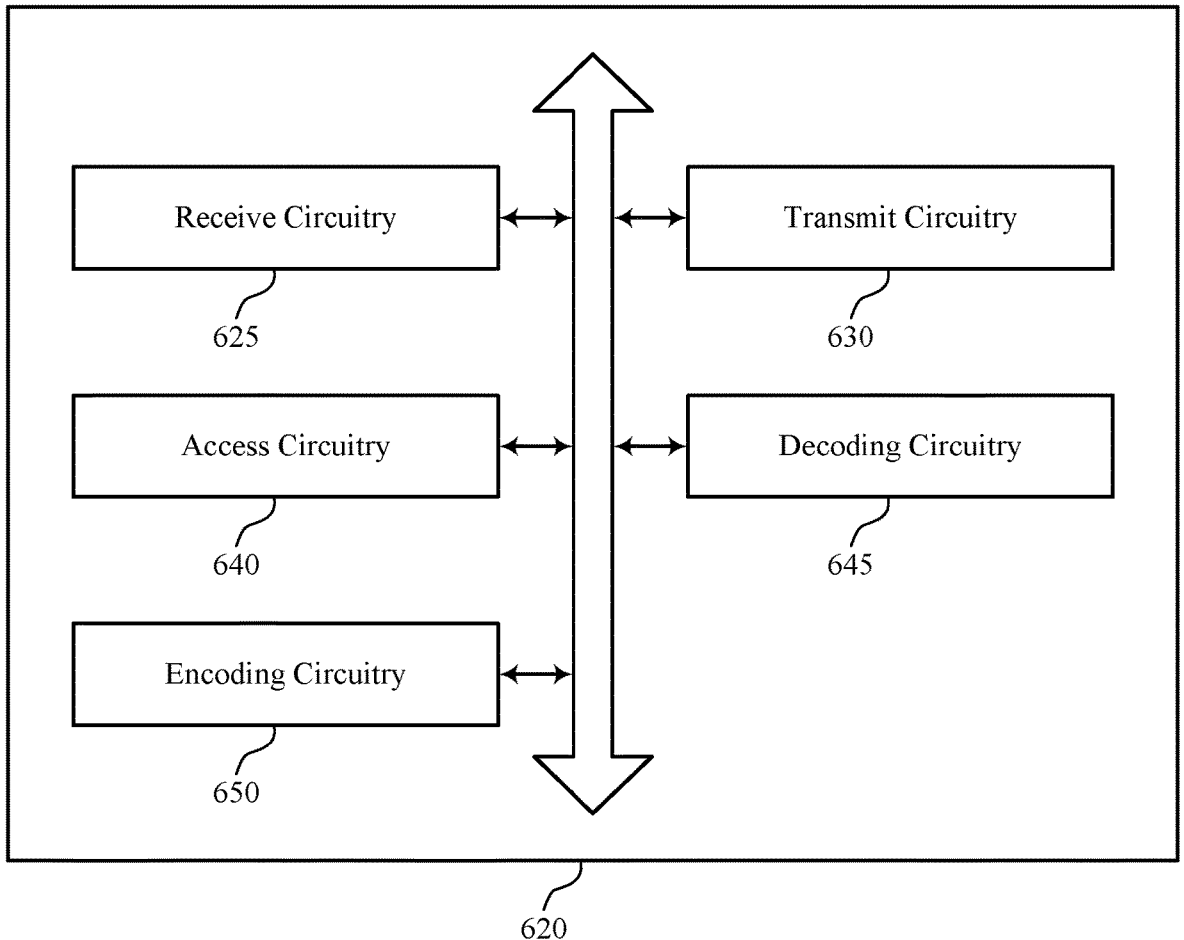
FIG. 6 shows a block diagram of a memory device that supports array access with receiver masking in accordance with examples as disclosed herein.

FIG. 6 shows a block diagram 600 of a memory device 620 that supports array access with receiver masking in accordance with examples as disclosed herein. The memory device 620 may be an example of aspects of a memory device as described with reference to FIGS. 1 through 4. The memory device 620, or various components thereof, may be an example of means for performing various aspects of array access with receiver masking as described herein. For example, the memory device 620 may include a receive circuitry 625, a transmit circuitry 630, an access circuitry 640, a decoding circuitry 645, an encoding circuitry 650, or any combination thereof. Each of these components may communicate, directly or indirectly, with one another (e.g., via one or more buses).

The receive circuitry 625 may be configured as or otherwise support a means for receiving, from a second device, a first sequence of write commands for a set of data, the first sequence of write commands indicating different memory addresses of a memory array in an order. In some examples, the receive circuitry 625 may be configured as or otherwise support a means for receiving, from the second device, a second sequence of read commands for the set of data, the second sequence of read commands indicating the different memory addresses in the same order as the first sequence of write commands. The transmit circuitry 630 may be configured as or otherwise support a means for sending, to the second device, the set of data based at least in part on receiving the second sequence of read commands.

In some examples, none of the write commands in the first sequence of write commands indicate a same address. In some examples, the access circuitry 640 may be configured as or otherwise support a means for writing the set of data to different memory addresses of the memory array based at least in part on the first sequence of write commands. In some examples, the access circuitry 640 may be configured as or otherwise support a means for reading the set of data from the different memory addresses of the memory array based at least in part on the second sequence of read commands.

In some examples, the decoding circuitry 645 may be configured as or otherwise support a means for performing MTA decoding on the set of data before writing the set of data to memory. In some examples, the encoding circuitry 650 may be configured as or otherwise support a means for performing MTA encoding on the set of data before sending the set of data to the second device.

In some examples, the receive circuitry 625 may be configured as or otherwise support a means for enabling a receiver masking mode at the first device, where the receiver masking mode disables a subset of sub-receivers in a receiver of the first device. In some examples, the receive circuitry 625 may be configured as or otherwise support a means for receiving a command indicating the receiver masking mode, where the receiver masking mode is enabled based at least in part on the command.

In some examples, the first sequence of write commands is separated from another sequence of write commands by at least a threshold duration. In some examples, the write commands of the first sequence of write commands are separated from each other by less than the threshold duration. In some examples, the second sequence of read commands is separated from another sequence of read commands by at least a threshold duration. In some examples, the read commands of the second sequence of read commands are separated from each other by less than the threshold duration.

Figure 7:
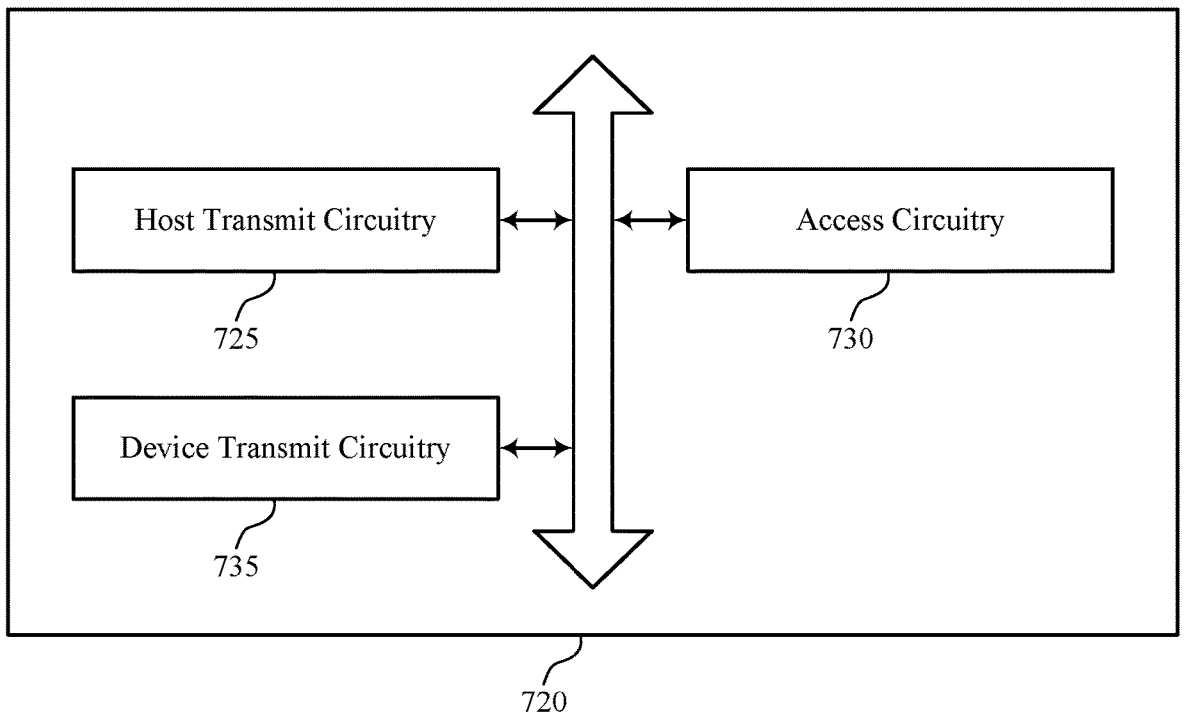
FIG. 7 shows a block diagram of a system that supports array access with receiver masking in accordance with examples as disclosed herein.

FIG. 7 shows a block diagram 700 of a system 720 that supports array access with receiver masking in accordance with examples as disclosed herein. The system 720 may be an example of aspects of a system as described with reference to FIGS. 1 through 4. The system 720, or various components thereof, may be an example of means for performing various aspects of array access with receiver masking as described herein. For example, the system 720 may include a host transmit circuitry 725, an access circuitry 730, a device transmit circuitry 735, or any combination thereof. Each of these components may communicate, directly or indirectly, with one another (e.g., via one or more buses).

The host transmit circuitry 725 may be configured as or otherwise support a means for issuing, by a first device to a second device, a first sequence of write commands for a set of data, the first sequence of write commands indicating a set of unique memory addresses in an order. The access circuitry 730 may be configured as or otherwise support a means for writing, by the second device, the set of data to the set of unique memory addresses in a memory array based at least in part on the first sequence of write commands. In some examples, the host transmit circuitry 725 may be configured as or otherwise support a means for issuing, by the first device to the second device based at least in part on issuing the first sequence of write commands, a second sequence of read commands for the set of data, the second sequence of read commands indicating the set of unique memory addresses in the same order as the first sequence of write commands. In some examples, the access circuitry 730 may be configured as or otherwise support a means for reading, by the second device, the set of data from the set of unique memory addresses in the memory array based at least in part on the second sequence of read commands. The device transmit circuitry 735 may be configured as or otherwise support a means for sending the set of data from the second device to the first device based at least in part on the second sequence of read commands.

Figure 8:
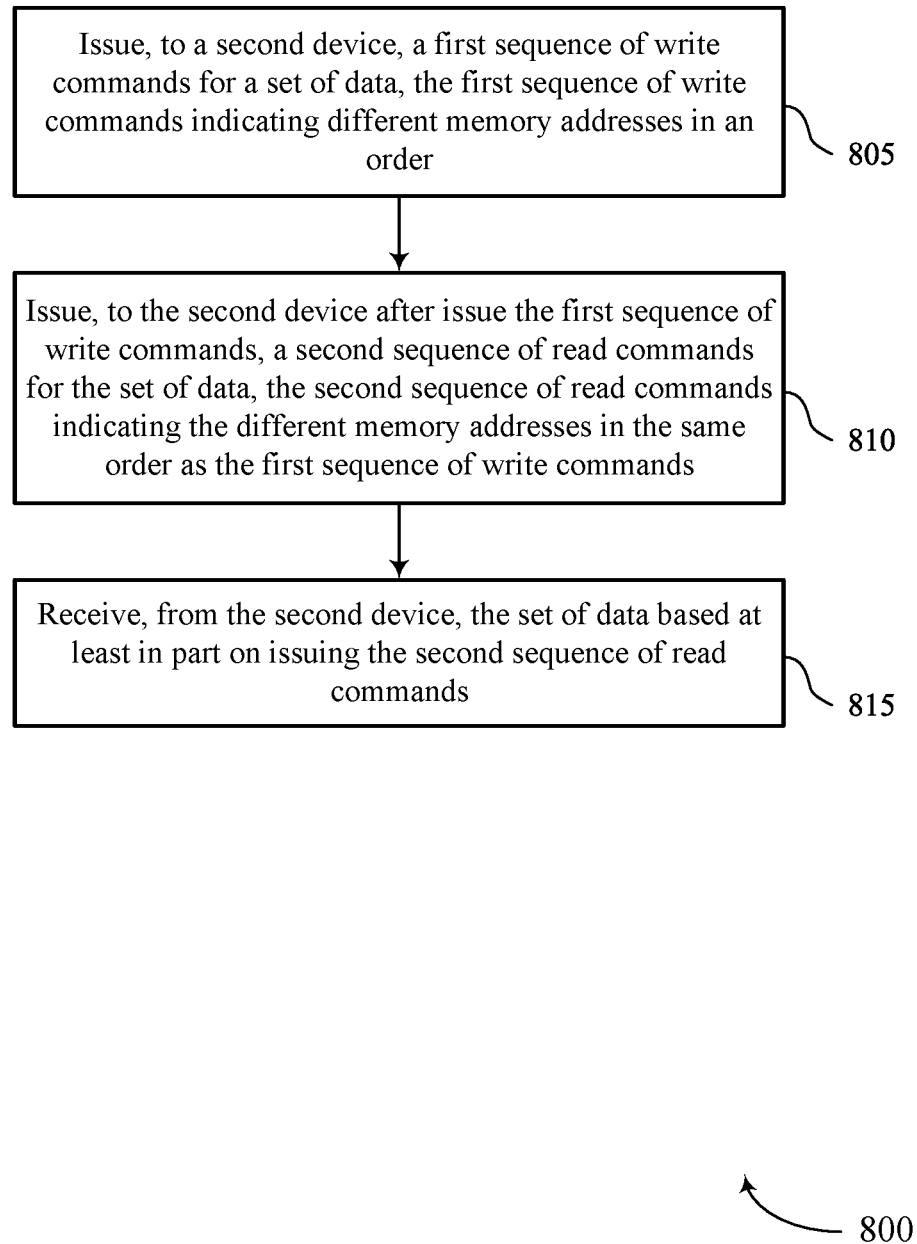
FIGS. 8 through 10 show flowcharts illustrating a method or methods that support array access with receiver masking in accordance with examples as disclosed herein.

FIG. 8 shows a flowchart illustrating a method 800 that supports array access with receiver masking in accordance with examples as disclosed herein. The operations of method 800 may be implemented by a host device or its components as described herein. For example, the operations of method 800 may be performed by a host device as described with reference to FIGS. 1 through 5. In some examples, a host device may execute a set of instructions to control the functional elements of the device to perform the described functions. Additionally or alternatively, the host device may perform aspects of the described functions using special-purpose hardware.

At 805, the method may include issuing, to a second device, a first sequence of write commands for a set of data, the first sequence of write commands indicating different memory addresses in an order. The operations of 805 may be performed in accordance with examples as disclosed herein. In some examples, aspects of the operations of 805 may be performed by a transmit circuitry 525 as described with reference to FIG. 5.

At 810, the method may include issuing, to the second device after issuing the first sequence of write commands, a second sequence of read commands for the set of data, the second sequence of read commands indicating the different memory addresses in the same order as the first sequence of write commands. The operations of 810 may be performed in accordance with examples as disclosed herein. In some examples, aspects of the operations of 810 may be performed by a transmit circuitry 525 as described with reference to FIG. 5.

At 815, the method may include receiving, from the second device, the set of data based at least in part on issuing the second sequence of read commands. The operations of 815 may be performed in accordance with examples as disclosed herein. In some examples, aspects of the operations of 815 may be performed by a receive circuitry 530 as described with reference to FIG. 5.

In some examples, an apparatus as described herein may perform a method or methods, such as the method 800. The apparatus may include, features, circuitry, logic, means, or instructions (e.g., a non-transitory computer-readable medium storing instructions executable by a processor) for issuing, to a second device, a first sequence of write commands for a set of data, the first sequence of write commands indicating different memory addresses in an order, issuing, to the second device after issuing the first sequence of write commands, a second sequence of read commands for the set of data, the second sequence of read commands indicating the different memory addresses in the same order as the first sequence of write commands, and receiving, from the second device, the set of data based at least in part on issuing the second sequence of read commands.

In some examples of the method 800 and the apparatus described herein, each of the write commands in the first sequence of write commands indicate a respective unique address. Some examples of the method 800 and the apparatus described herein may further include operations, features, circuitry, logic, means, or instructions for determining that a timing condition associated with the first sequence of write commands may be satisfied, where the first sequence of write commands may be determined based at least in part on the timing condition being satisfied.

In some examples of the method 800 and the apparatus described herein, determining that the timing condition may be satisfied may include operations, features, circuitry, logic, means, or instructions for determining that a first write command of the first sequence of write commands may be separated from a preceding write command by at least a threshold duration and determining that a last write command of the first sequence of write commands may be separated from a subsequent write command by at least the threshold duration.

In some examples of the method 800 and the apparatus described herein, the write commands of the first sequence may be separated from each other by less than the threshold duration. Some examples of the method 800 and the apparatus described herein may further include operations, features, circuitry, logic, means, or instructions for read commands of the second sequence may be separated from each other by less than the threshold duration and the second sequence of read commands may be separated from one or more other sequences of read commands by at least the threshold duration.

In some examples of the method 800 and the apparatus described herein, issuing, to the second device, a command indicating a receiver masking mode that disables a subset of sub-receivers in a receiver of the second device, where the first sequence of write commands may be issued to the second device based at least in part on issuing the command indicating the receiver masking mode.

Some examples of the method 800 and the apparatus described herein may further include operations, features, circuitry, logic, means, or instructions for performing MTA encoding on the set of data and sending the set of data to the second device based at least in part on performing MTA encoding. Some examples of the method 800 and the apparatus described herein may further include operations, features, circuitry, logic, means, or instructions for performing MTA decoding on the received set of data based on sending the set of data to the second device.

Figure 9:
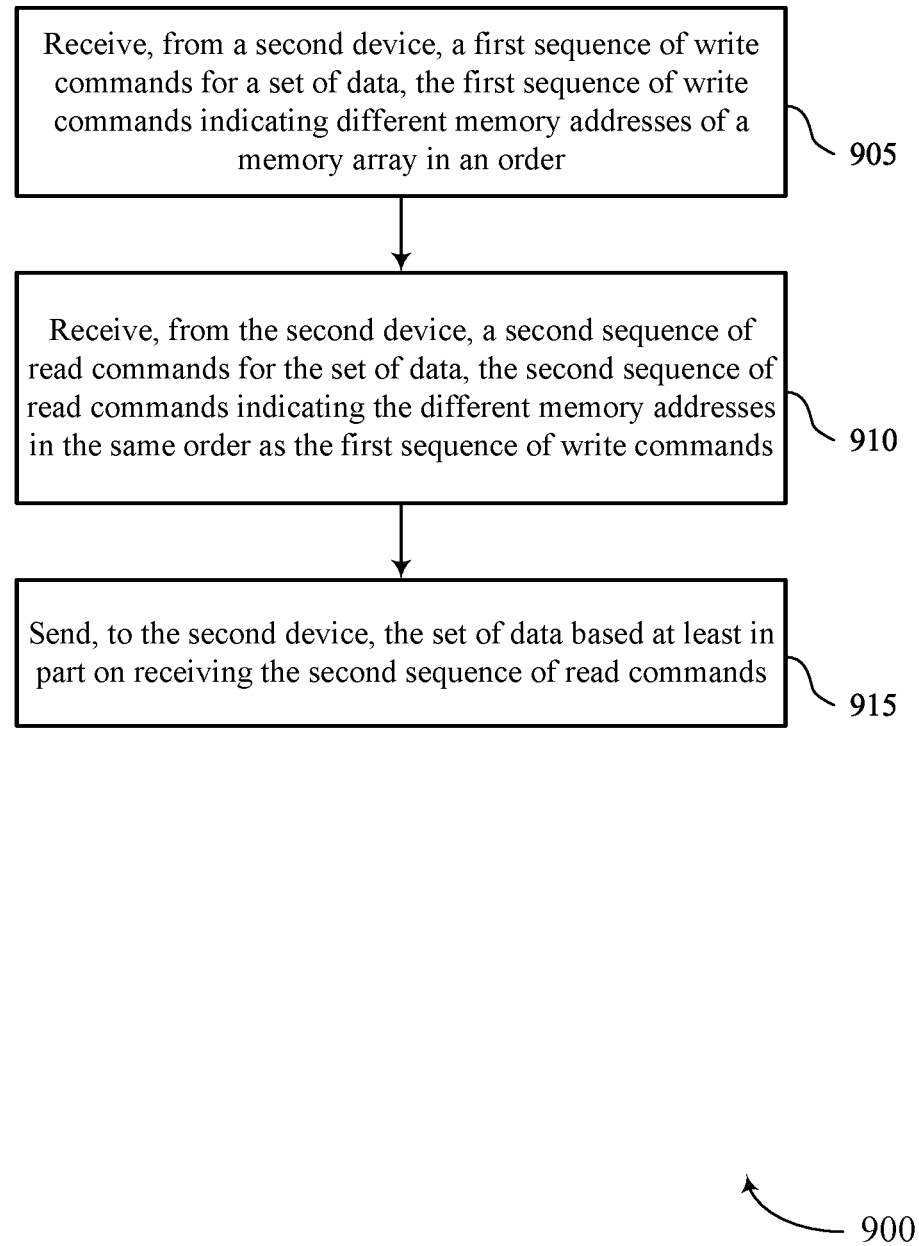

FIG. 9 shows a flowchart illustrating a method 900 that supports array access with receiver masking in accordance with examples as disclosed herein. The operations of method 900 may be implemented by a memory device or its components as described herein. For example, the operations of method 900 may be performed by a memory device as described with reference to FIGS. 1 through 4 and 6. In some examples, a memory device may execute a set of instructions to control the functional elements of the device to perform the described functions. Additionally or alternatively, the memory device may perform aspects of the described functions using special-purpose hardware.

At 905, the method may include receiving, from a second device, a first sequence of write commands for a set of data, the first sequence of write commands indicating different memory addresses of a memory array in an order. The operations of 905 may be performed in accordance with examples as disclosed herein. In some examples, aspects of the operations of 905 may be performed by a receive circuitry 625 as described with reference to FIG. 6.

At 910, the method may include receiving, from the second device, a second sequence of read commands for the set of data, the second sequence of read commands indicating the different memory addresses in the same order as the first sequence of write commands. The operations of 910 may be performed in accordance with examples as disclosed herein. In some examples, aspects of the operations of 910 may be performed by a receive circuitry 625 as described with reference to FIG. 6.

At 915, the method may include sending, to the second device, the set of data based at least in part on receiving the second sequence of read commands. The operations of 915 may be performed in accordance with examples as disclosed herein. In some examples, aspects of the operations of 915 may be performed by a transmit circuitry 630 as described with reference to FIG. 6.

In some examples, an apparatus as described herein may perform a method or methods, such as the method 900. The apparatus may include, features, circuitry, logic, means, or instructions (e.g., a non-transitory computer-readable medium storing instructions executable by a processor) for receiving, from a second device, a first sequence of write commands for a set of data, the first sequence of write commands indicating different memory addresses of a memory array in an order, receiving, from the second device, a second sequence of read commands for the set of data, the second sequence of read commands indicating the different memory addresses in the same order as the first sequence of write commands, and sending, to the second device, the set of data based at least in part on receiving the second sequence of read commands.

In some examples of the method 900 and the apparatus described herein, none of the write commands in the first sequence of write commands indicate a same address. Some examples of the method 900 and the apparatus described herein may further include operations, features, circuitry, logic, means, or instructions for writing the set of data to different memory addresses of the memory array based at least in part on the first sequence of write commands and reading the set of data from the different memory addresses of the memory array based at least in part on the second sequence of read commands.

Some examples of the method 900 and the apparatus described herein may further include operations, features, circuitry, logic, means, or instructions for performing MTA decoding on the set of data before writing the set of data to memory and performing MTA encoding on the set of data before sending the set of data to the second device.

Some examples of the method 900 and the apparatus described herein may further include operations, features, circuitry, logic, means, or instructions for enabling a receiver masking mode at the first device, where the receiver masking mode disables a subset of sub-receivers in a receiver of the first device.

Some examples of the method 900 and the apparatus described herein may further include operations, features, circuitry, logic, means, or instructions for receiving a command indicating the receiver masking mode, where the receiver masking mode may be enabled based at least in part on the command.

In some examples of the method 900 and the apparatus described herein, the first sequence of write commands may be separated from another sequence of write commands by at least a threshold duration, and the write commands of the first sequence of write commands may be separated from each other by less than the threshold duration.

In some examples of the method 900 and the apparatus described herein, the second sequence of read commands may be separated from another sequence of read commands by at least a threshold duration, and the read commands of the second sequence of read commands may be separated from each other by less than the threshold duration.

Figure 10:
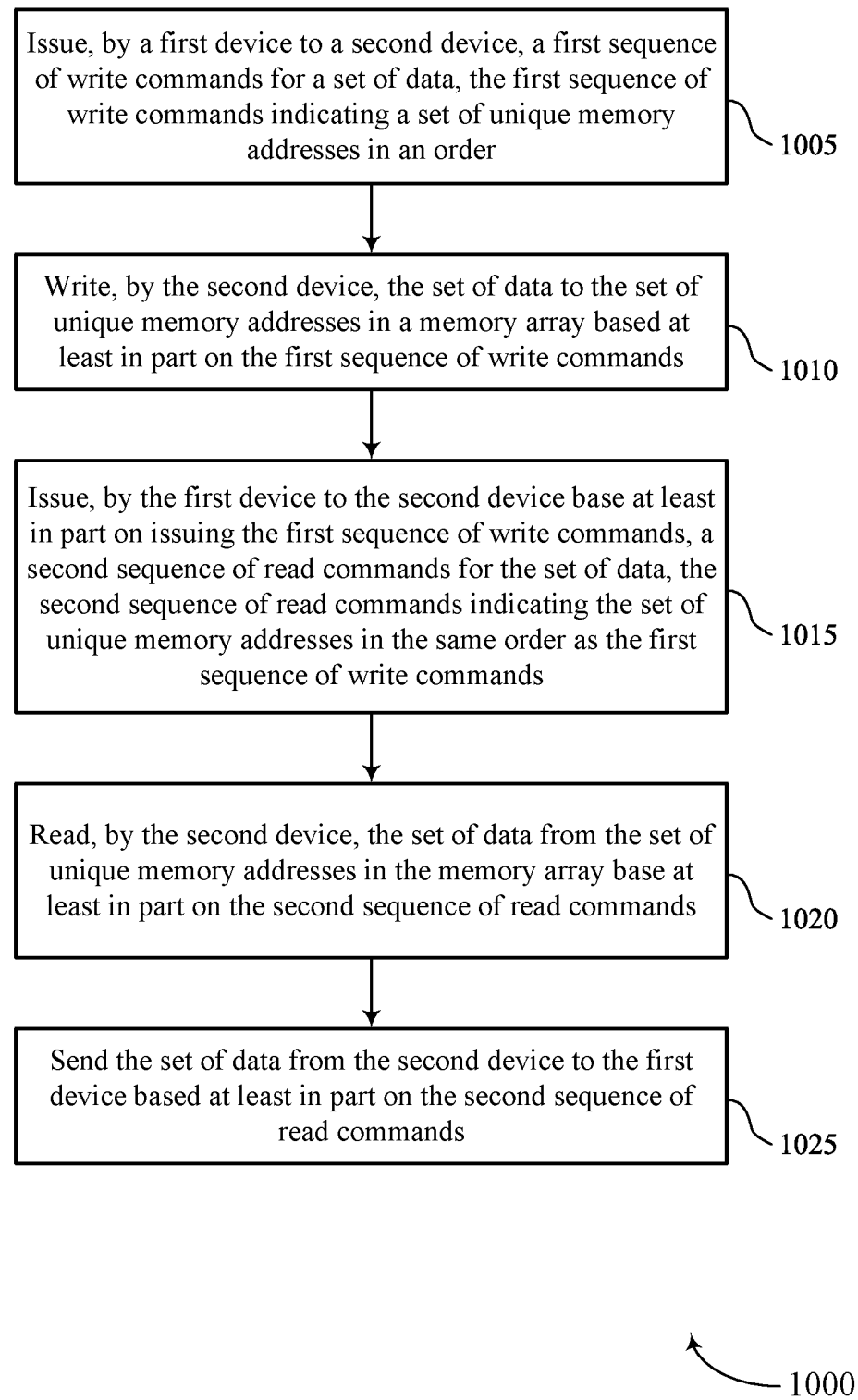

FIG. 10 shows a flowchart illustrating a method 1000 that supports array access with receiver masking in accordance with examples as disclosed herein. The operations of method 1000 may be implemented by a system or its components as described herein. For example, the operations of method 1000 may be performed by a system as described with reference to FIGS. 1 through 4 and 7. In some examples, a system may execute a set of instructions to control the functional elements of the device to perform the described functions. Additionally or alternatively, the system may perform aspects of the described functions using special-purpose hardware.

At 1005, the method may include issuing, by a first device to a second device, a first sequence of write commands for a set of data, the first sequence of write commands indicating a set of unique memory addresses in an order. The operations of 1005 may be performed in accordance with examples as disclosed herein. In some examples, aspects of the operations of 1005 may be performed by a host transmit circuitry 725 as described with reference to FIG. 7.

At 1010, the method may include writing, by the second device, the set of data to the set of unique memory addresses in a memory array based at least in part on the first sequence of write commands. The operations of 1010 may be performed in accordance with examples as disclosed herein. In some examples, aspects of the operations of 1010 may be performed by an access circuitry 730 as described with reference to FIG. 7.

At 1015, the method may include issuing, by the first device to the second device based at least in part on issuing the first sequence of write commands, a second sequence of read commands for the set of data, the second sequence of read commands indicating the set of unique memory addresses in the same order as the first sequence of write commands. The operations of 1015 may be performed in accordance with examples as disclosed herein. In some examples, aspects of the operations of 1015 may be performed by a host transmit circuitry 725 as described with reference to FIG. 7.

At 1020, the method may include reading, by the second device, the set of data from the set of unique memory addresses in the memory array based at least in part on the second sequence of read commands. The operations of 1020 may be performed in accordance with examples as disclosed herein. In some examples, aspects of the operations of 1020 may be performed by an access circuitry 730 as described with reference to FIG. 7.

At 1025, the method may include sending the set of data from the second device to the first device based at least in part on the second sequence of read commands. The operations of 1025 may be performed in accordance with examples as disclosed herein. In some examples, aspects of the operations of 1025 may be performed by a device transmit circuitry 735 as described with reference to FIG. 7.

In some examples, an apparatus as described herein may perform a method or methods, such as the method 1000. The apparatus may include, features, circuitry, logic, means, or instructions (e.g., a non-transitory computer-readable medium storing instructions executable by a processor) for issuing, by a first device to a second device, a first sequence of write commands for a set of data, the first sequence of write commands indicating a set of unique memory addresses in an order, writing, by the second device, the set of data to the set of unique memory addresses in a memory array based at least in part on the first sequence of write commands, issuing, by the first device to the second device based at least in part on issuing the first sequence of write commands, a second sequence of read commands for the set of data, the second sequence of read commands indicating the set of unique memory addresses in the same order as the first sequence of write commands, reading, by the second device, the set of data from the set of unique memory addresses in the memory array based at least in part on the second sequence of read commands, and sending the set of data from the second device to the first device based at least in part on the second sequence of read commands.

It should be noted that the methods described herein describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The term "layer" or "level" used herein refers to a stratum or sheet of a geometrical structure (e.g., relative to a substrate). Each layer or level may have three dimensions (e.g., height, width, and depth) and may cover at least a portion of a surface. For example, a layer or level may be a three dimensional structure where two dimensions are greater than a third, e.g., a thin-film. Layers or levels may include different elements, components, and/or materials. In some examples, one layer or level may be composed of two or more sublayers or sublevels.

As used herein, the term "substantially" means that the modified characteristic (e.g., a verb or adjective modified by the term substantially) need not be absolute but is close enough to achieve the advantages of the characteristic.

As used herein, the term "electrode" may refer to an electrical conductor, and in some examples, may be employed as an electrical contact to a memory cell or other component of a memory array. An electrode may include a trace, wire, conductive line, conductive layer, or the like that provides a conductive path between elements or components of a memory array.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method at a first device, comprising:
   issuing, to a second device, a first sequence of write commands for writing a set of data by the second device, the first sequence of write commands indicating different memory addresses in an order;
   issuing, to the second device after issuing the first sequence of write commands, a second sequence of read commands for reading the set of data by the second device to the first device, the second sequence of read commands indicating the different memory addresses in the same order as the first sequence of write commands; and
   receiving, from the second device, the set of data based at least in part on issuing the second sequence of read commands.

2. The method of claim 1, wherein each of the write commands in the first sequence of write commands indicate a respective unique address.

3. The method of claim 1, further comprising:
   determining that a timing condition associated with the first sequence of write commands is satisfied, wherein the first sequence of write commands is determined based at least in part on the timing condition being satisfied.

4. The method of claim 3, wherein determining that the timing condition is satisfied comprises:
   determining that a first write command of the first sequence of write commands is separated from a preceding write command by at least a threshold duration; and
   determining that a last write command of the first sequence of write commands is separated from a subsequent write command by at least the threshold duration.

5. The method of claim 4, wherein the write commands of the first sequence are separated from each other by less than the threshold duration.

6. The method of claim 4, wherein read commands of the second sequence of read commands are separated from each other by less than the threshold duration and the second sequence of read commands is separated from one or more other sequences of read commands by at least the threshold duration.

7. The method of claim 1, further comprising:
   issuing, to the second device, a command indicating a receiver masking mode that disables a subset of sub-receivers in a receiver of the second device, wherein the first sequence of write commands is issued to the second device based at least in part on issuing the command indicating the receiver masking mode.

8. The method of claim 7, further comprising:
   performing maximum transition avoidance (MTA) encoding on the set of data; and
   sending the set of data to the second device based at least in part on performing MTA encoding.

9. The method of claim 8, further comprising:
   performing MTA decoding on the received set of data based at least in part on sending the set of data to the second device.

10. The method of claim 1, wherein:
    a first quantity of non-functional commands is issued between a first write command of the first sequence of write commands and a second write command of the first sequence of write commands, and
    a second quantity of non-functional commands different than the first quantity is issued between a first read command of the second sequence of read commands and a second read command of the second sequence of read commands.

11. A method at a first device, comprising:
    receiving, from a second device, a first sequence of write commands for writing a set of data by the first device, the first sequence of write commands indicating different memory addresses of a memory array in an order;
    receiving, from the second device, a second sequence of read commands for reading the set of data by the first device to the second device, the second sequence of read commands indicating the different memory addresses in the same order as the first sequence of write commands; and
    sending, to the second device, the set of data based at least in part on receiving the second sequence of read commands.

12. The method of claim 11, wherein none of the write commands in the first sequence of write commands indicate a same address.

13. The method of claim 11, further comprising:
    writing the set of data to the different memory addresses of the memory array based at least in part on the first sequence of write commands; and reading the set of data from the different memory addresses of the memory array based at least in part on the second sequence of read commands.

14. The method of claim 13, further comprising:
performing maximum transition avoidance (MTA) decoding on the set of data before writing the set of data to memory; and
performing MTA encoding on the set of data before sending the set of data to the second device.

15. The method of claim 14, further comprising:
enabling a receiver masking mode at the first device, wherein the receiver masking mode disables a subset of sub-receivers in a receiver of the first device.

16. The method of claim 15, further comprising:
receiving a command indicating the receiver masking mode, wherein the receiver masking mode is enabled based at least in part on the command.

17. The method of claim 11, wherein the first sequence of write commands is separated from another sequence of write commands by at least a threshold duration, and the write commands of the first sequence of write commands are separated from each other by less than the threshold duration.

18. The method of claim 11, wherein the second sequence of read commands is separated from another sequence of read commands by at least a threshold duration, and the read commands of the second sequence of read commands are separated from each other by less than the threshold duration.

19. A non-transitory computer-readable medium storing code comprising instructions which, when executed by a processor of a first device, cause the first device to:
issue to a second device a first sequence of write commands for writing a set of data stored at a set of memory addresses by the second device, the first sequence of write commands indicating different memory addresses, of the set of memory addresses, in an order;
issue, to the second device after issuing the first sequence of write commands, a second sequence of read commands for reading the set of data by the second device to the first device, the second sequence of read commands indicating the different memory addresses in the same order as the first sequence of write commands; and
receive, from the second device, the set of data based at least in part on issuing the second sequence of read commands.

20. The non-transitory computer-readable medium of claim 19, wherein the instructions, when executed by the processor of the first device, cause the first device to:
determine that a first write command of the first sequence of write commands is separated from a preceding write command by at least a threshold duration, wherein the first sequence of write commands is determined based at least in part on the first write command being separated from the preceding write command by at least the threshold duration; and
determine that a last write command of the first sequence of write commands is separated from a subsequent write command by at least the threshold duration, wherein the first sequence of write commands is determined based at least in part on the last write command being separated from the subsequent write command by at least the threshold duration.

21. The non-transitory computer-readable medium of claim 19, wherein the write commands of the first sequence are separated from each other by less than a threshold duration.

22. The non-transitory computer-readable medium of claim 19, wherein read commands of the second sequence of read commands are separated from each other by less than a threshold duration and the second sequence of read commands is separated from one or more other sequences of read commands by at least the threshold duration.

23. The non-transitory computer-readable medium of claim 19, wherein the instructions, when executed by the processor of the first device, cause the first device to:
issue to the second device a command indicating a receiver masking mode that disables a subset of sub-receivers in a receiver of the second device, wherein the first sequence of write commands is issued to the second device based at least in part on issuing the command indicating the receiver masking mode.

24. The non-transitory computer-readable medium of claim 19, wherein the instructions, when executed by the processor of the first device, cause the first device to:
perform maximum transition avoidance (MTA) encoding on the set of data;
send the set of data to the second device based at least in part on performing MTA encoding; and
perform MTA decoding on the received set of data.

25. A non-transitory computer-readable medium storing code comprising instructions which, when executed by a processor of a first device, cause the first device to:
receive from a second device a first sequence of write commands for writing a set of data stored at a set of memory addresses by the first device, the first sequence of write commands indicating different memory addresses, of the set of memory addresses, in an order;
receive from the second device a second sequence of read commands for reading the set of data by the first device to the second device, the second sequence of read commands indicating the different memory addresses of the set of memory addresses in the same order as the first sequence of write commands; and
send, to the second device, the set of data based at least in part on receiving the second sequence of read commands.

26. The non-transitory computer-readable medium of claim 25, wherein the instructions, when executed by the processor of the first device, cause the first device to:
write the set of data to the different memory addresses of a memory array based at least in part on the first sequence of write commands; and
read the set of data from the memory array based at least in part on the second sequence of read commands.

27. The non-transitory computer-readable medium of claim 26, wherein the instructions, when executed by the processor of the first device, cause the first device to:
enable a receiver masking mode at the first device, wherein the receiver masking mode disables a subset of sub-receivers in a receiver of the first device.

28. The non-transitory computer-readable medium of claim 27, wherein the instructions, when executed by the processor of the first device, cause the first device to:
perform maximum transition avoidance (MTA) decoding on the set of data before writing the set of data to memory; and
perform MTA encoding on the set of data before sending the set of data to the second device.

29. The non-transitory computer-readable medium of claim 25, wherein the first sequence of write commands is separated from another sequence of write commands by at least a threshold duration, and wherein the write commands of the first sequence of write commands are separated from each other by less than the threshold duration.

30. A method, comprising:
- issuing, by a first device to a second device, a first sequence of write commands for writing a set of data by the second device, the first sequence of write commands indicating a set of unique memory addresses in an order;
- writing, by the second device, the set of data to the set of unique memory addresses in a memory array based at least in part on the first sequence of write commands;
- issuing, by the first device to the second device based at least in part on issuing the first sequence of write commands, a second sequence of read commands for reading the set of data by the second device to the first device, the second sequence of read commands indicating the set of unique memory addresses in the same order as the first sequence of write commands;
- reading, by the second device, the set of data from the set of unique memory addresses in the memory array based at least in part on the second sequence of read commands; and
- sending the set of data from the second device to the first device based at least in part on the second sequence of read commands.

* * * * *